US005492630A

United States Patent [19]
Roshanravan et al.

[11] Patent Number: 5,492,630
[45] Date of Patent: Feb. 20, 1996

[54] METHOD AND APPARATUS FOR DISSOLVED AIR FLOTATION WITH AERATION

[75] Inventors: Mel Roshanravan, Coppell; Michael W. Grosskopf, Carrollton, both of Tex.

[73] Assignee: Darling International, Inc., Irving, Tex.

[21] Appl. No.: 342,644

[22] Filed: Nov. 21, 1994

Related U.S. Application Data

[63] Continuation of Ser. No. 75,349, Jun. 9, 1993, abandoned, which is a continuation of Ser. No. 850,293, Mar. 12, 1992, abandoned, which is a division of Ser. No. 521,396, May 10, 1990, Pat. No. 5,151,177.

[51] Int. Cl.⁶ .............................. C02F 1/24; B01D 17/035
[52] U.S. Cl. .......................... 210/703; 210/712; 210/741; 210/744; 210/805; 210/221.2; 261/36.1; 261/DIG. 75
[58] Field of Search .............................. 210/703, 744, 210/805, 741, 221.2, 197, 194, 712; 261/36.1, DIG. 75

[56] References Cited

U.S. PATENT DOCUMENTS

| | | | |
|---|---|---|---|
| 2,793,185 | 5/1957 | Albrektsson . | |
| 3,175,687 | 3/1965 | Jones | 210/221.2 |
| 4,049,553 | 9/1977 | Stebbins | 210/221.2 |
| 4,564,457 | 1/1986 | Cairo | 210/221.2 |
| 4,782,789 | 11/1988 | Canzoneri | 210/744 |
| 4,824,579 | 4/1989 | George | 210/744 |
| 4,956,080 | 9/1990 | Josefik | 210/221.2 |
| 4,986,903 | 1/1991 | Canzoneri | 210/703 |
| 5,049,320 | 9/1991 | Wang | 261/122 |
| 5,064,531 | 11/1991 | Wang | 210/221.2 |
| 5,068,031 | 11/1991 | Wang | 210/221.2 |
| 5,069,783 | 12/1991 | Wang | 210/221.2 |
| 5,078,861 | 1/1992 | Krofta | 210/744 |
| 5,080,802 | 1/1992 | Cairo | 210/708 |
| 5,084,165 | 1/1992 | Wang | 210/221.2 |
| 5,087,377 | 1/1992 | Josefik | 210/703 |
| 5,151,177 | 9/1992 | Roshanravan | 210/86 |

Primary Examiner—Thomas M. Lithgow
Attorney, Agent, or Firm—Harold E. Meier

[57] ABSTRACT

A method and apparatus for aeration of waste water in a dissolved air flotation waste water treatment system includes a container for receiving and retaining waste water for settling of heavy particles and flotation of light particles to the surface of the waste water. Waste water is removed from the container and supplied to a free standing tank. Pressure in the tank is maintained at a predetermined level through the injection of compressed air into the tank. Waste water removed from the tank is pumped through a multiple jet configuration wherein air from the tank is entrained in the waste water as the water is injected back into the tank. The aerated water is discharged from the tank back into the container, thereby providing an efficient aeration process. Aerating the water in a free standing tank separate from the container increases clarification quality as a result of reduced disturbance of the particles floated to the surface of the waste water and reduced need for chemical addition to the waste water.

5 Claims, 6 Drawing Sheets

METHOD AND APPARATUS FOR DISSOLVED AIR FLOTATION WITH AERATION

This is a continuation of Ser. No. 08/075,349 filed Jun. 9, 1993, now abandoned; which is a continuation of Ser. No. 07/850293 filed Mar. 12, 1992, now abandoned; which is a divisional of Ser. No. 07/521396, filed May 10, 1990; now U.S. Pat. No. 5,151,177.

TECHNICAL FIELD

The present invention relates generally to dissolved air flotation treatment of waste water, and more particularly to a dissolved air flotation system having an aeration system separate from the dissolved air flotation ("DAF") container.

BACKGROUND OF THE INVENTION

In the treatment of waste water in a dissolved air flotation ("DAF") system, the solids are clarified through means of flotation of particles to the surface of the liquid. The flotation of particles to the surface of the liquid has been accomplished in the past through various means of aerating the waste water.

In a typical dissolved air flotation system, recycled water or the raw waste water is pressurized. Compressed air is added to the pressurization tank. This water, along with flocculating chemicals is introduced into the DAF vessel. Bubbles are formed as the air entrained in the water is released from pressure. The particles attach themselves to or become trapped by the bubbles. As the bubbles rise to the surface of the water, the particles are carried along. When the bubbles reach the surface the air escapes, forming a foam or sludge layer on the surface. The sludge layer contains the particles deposited by the escaping air bubbles. The sludge layer is kept intact and skimmed from the vessel to be processed by various means. Thus, through aeration, the waste water is fed needed air and chemicals and the water clarified.

Presently available methods and apparatus for aerating waste water in a DAF treatment system have failed to efficiently entrain sufficient amounts of air in the waste water necessary to obtain maximum particle flotation without substantial use of chemicals. Additionally, aeration of waste water using prior art methods and apparatus has further resulted in excess movement or circulation of the treated waste water, damaging the sludge layer formed.

SUMMARY OF THE INVENTION

The present invention overcomes the above difficulties by recirculating waste water from the dissolved air flotation ("DAF") container through an aeration system of the present invention for aeration of the waste water with minimum disturbance of the interior area of the DAF container. Aeration in a system remote from the DAF container maximizes air entrainment in the waste water before returning the water to the DAF container and thereby minimizes the need for flocculating chemicals. Thus, cycling of the water from the DAF container through the aeration system and back into the DAF container results in improved air entrainment in the water to increase flotation of particles, more efficient air utilization, and further clarification of the waste water with substantially less or no chemical addition, thereby creating a more efficient means of treating the waste water, increasing the quality of the resulting effluent, and producing a more easily handled sludge layer.

BRIEF DESCRIPTION OF THE DRAWINGS

A more complete understanding of the invention may be had by reference to the following Detailed Description when taken in conjunction with the Accompanying Drawings wherein.

DETAILED DESCRIPTION

Figures 1, 11, 12:
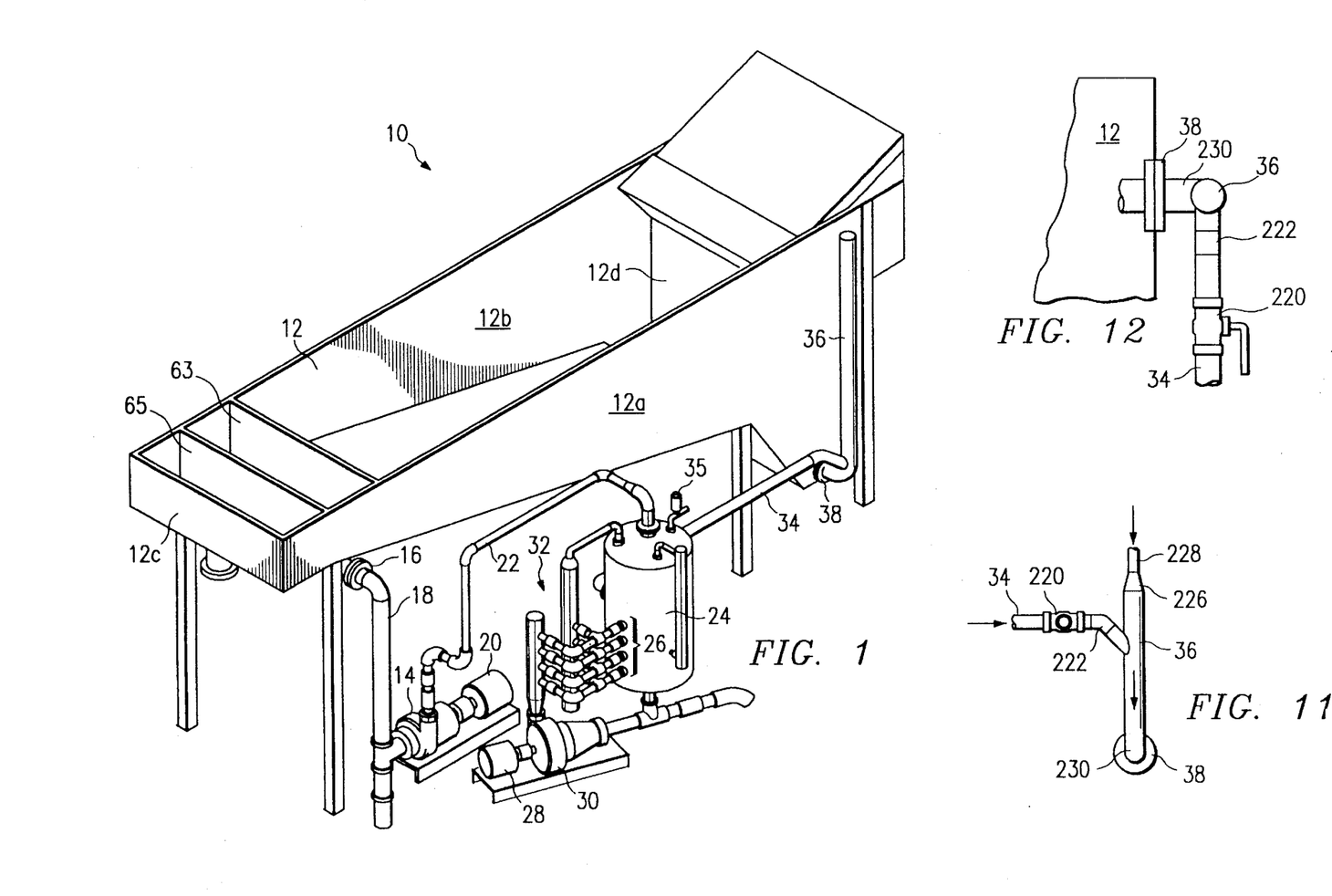
FIG. 1 is a perspective view of a dissolved air flotation system having a DAF container and an aeration system through which the waste water is recycled in accordance with the invention.
FIG. 11 is a side view of the piping configuration for directing the flow of aerated water from the aeration system of FIG. 8 to the DAF container of FIG. 2.
FIG. 12 is a top view of the piping configuration of FIG. 11.

Referring now to the Drawings, and more particularly to FIG. 1, there is shown a dissolved air flotation system 10 incorporating the present invention. The dissolved air flotation system 10 includes a dissolved air flotation ("DAF") container 12 having sides 12a and 12b, a front 12c, and a back 12d. Waste water in the container 12 is pumped by a recycle pump 14 from an outlet 16 in the uppermost end of the DAF container 12 near the front 12a through a recycle pipe 18. A motor 20 supplies operating power to the pump 14 to direct the flow of waste water through connecting pipe 22 to an aeration tank 24 as part of the aeration system 25.

A motor 28 provides operating power to an aeration pump 30 to pump waste water from the aeration tank 24 into a plurality of jets 26. Compressed air from the top of the aeration tank 24 passes through a piping configuration 32 into the jets 26 where it is entrained in the waste water as the water is forced through the jets by the pump 30 as a high pressure stream. The aerated water is then forced under pressure back into the aeration tank 24.

The aerated water in the aeration tank 24 is continuously returned to the DAF container 12 through a return piping configuration 34. Air pressure in the aeration tank 24 is maintained between 80 and 100 psi by means of a compressed air source (not shown) connected to the aeration tank through a compressed air inlet 35. The aerated water flows from the aeration tank 24 through the return piping 34 as a result of the maintained tank pressure. Return piping 34 intersects with a surge tank pipe 36, mixing the aerated water from the return piping with raw sewage in the surge tank pipe and channeling the resulting mixture through inlet 38 into the lowermost part of the back 12d of the DAF container 12.

The aeration cycle is a continuous one whereby approximately one-third (⅓) to one-half (½) of the total flow through the dissolved air flotation system 10 is passed through the aeration tank 24, thereby increasing the level of aeration of the system to improve flotation of particles from the water, and resulting in higher levels of clarity of the treated waste water.

Referring now to FIGS. 2, 3, 4 and 5 there is shown the DAF container 12 of FIG. 1. Raw waste water sewage is introduced into the DAF container 12 from inlet 38 through inlet pipe 40. The raw waste water sewage then enters a chamber 42 from where it flows into the DAF container 12. The DAF container 12 is supported on legs 50 equally spaced along the length thereof. Heavy particles contained in the raw waste water settle to the bottom of the DAF container 12. Lighter particles are floated to the surface of the water by air bubbles contained within the water in the container 12. As the particles are floated to the surface of the liquid held in the container 12, a foam or sludge layer forms on the top of the liquid.

A rake 52 having paddles 54 mounted on chains 56 skims the foam layer from the liquid, into a discharge chute 58 and out through a drain 60 as the chains are moved by means of rotating sprockets 62. The rake 52 passes over a frame 64 mounted above and to the walls of the container 12 as the chains 56 rotate with the sprockets 62.

Figure 2:
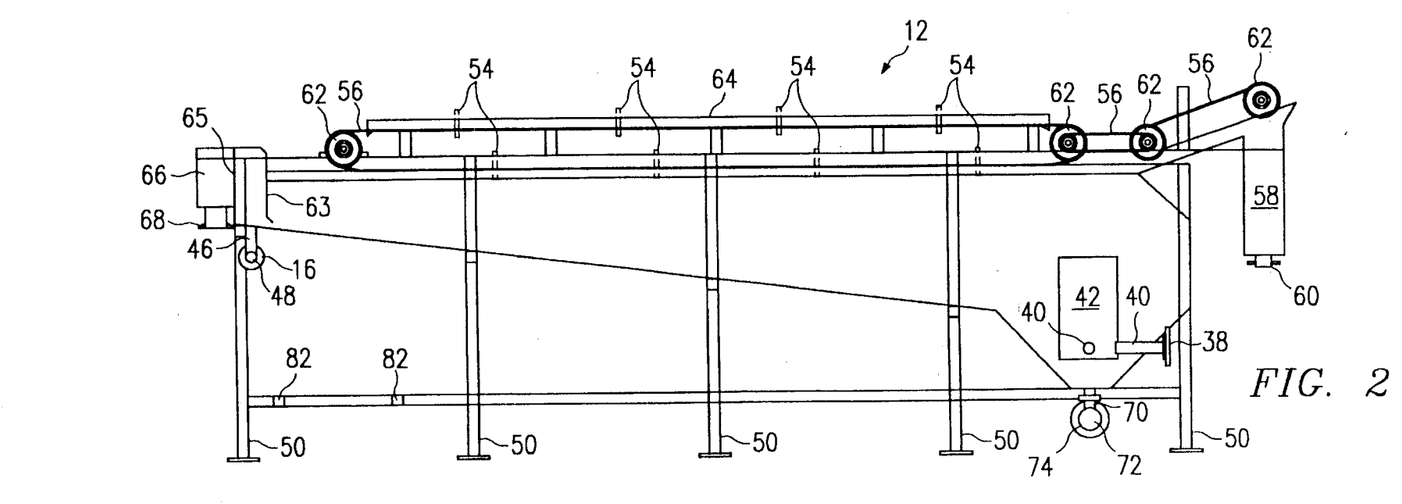
FIG. 2 is a side view of the DAF container of FIG. 1.
Figure 3:
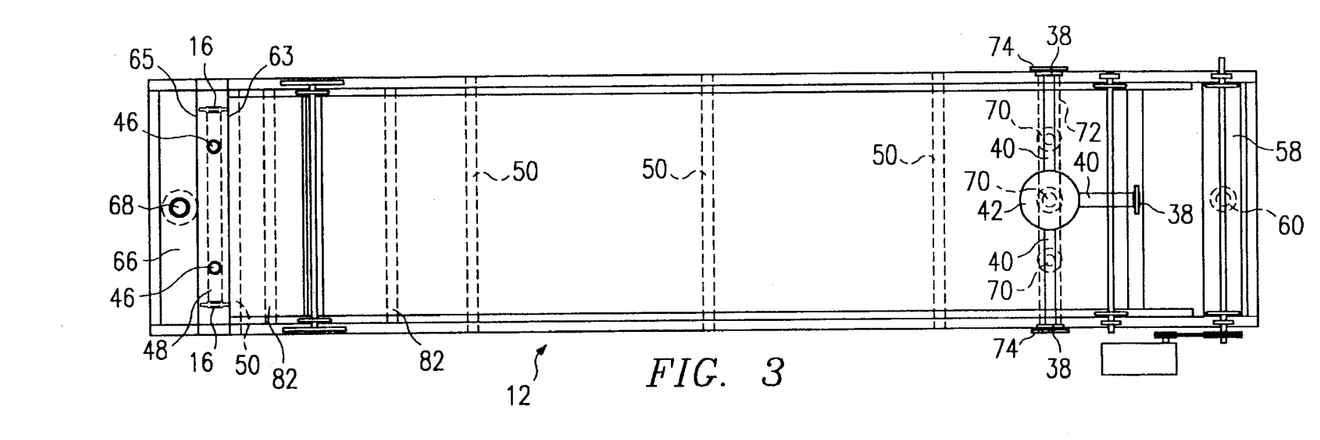
FIG. 3 is a top view of the DAF container of FIG. 2.
Figure 4:
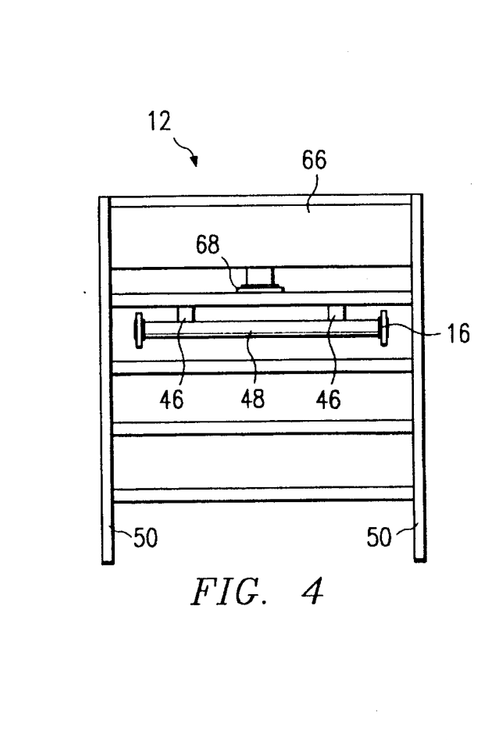
FIG. 4 is a front view of the DAF container of FIG. 2, illustrating in greater detail the outlets through which the waste water is cycled to the aeration system.
Figure 5:
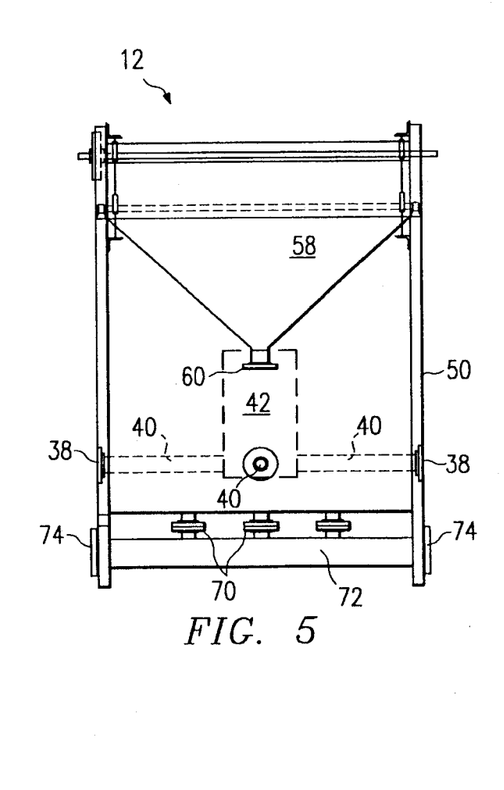
FIG. 5 is a back view of the DAF container of FIG. 2, illustrating in greater detail the inlets for returning aerated water from the aeration system to the DAF container.

Waste water having the desired degree of clarification is discharged from the container 12 into an effluent discharge chute 66 and out a drain 68 after passing under a baffle 63 and over a dam 65 as shown in FIGS. 2, 3, and 4. The heavier particles that settle to the bottom of the container 12 are discharged from the system through drains 70 into a drain pipe 72, and out through outlets 74 as shown in FIGS. 2, 3, and 5.

Referring now to FIGS. 2, 3, 4, 6, and 7, to increase the number of air bubbles in the water and thereby improve flotation of the lighter particles to the surface, the water is withdrawn from the container 12 through drains 46 into an outlet pipe 48 from where it is pumped through the particular outlet 16 having the recycle pipe 18 connected thereto. The flow of the water from the container 12 is directed through the recycle pipe 18 into the aeration system 25.

Figure 6:
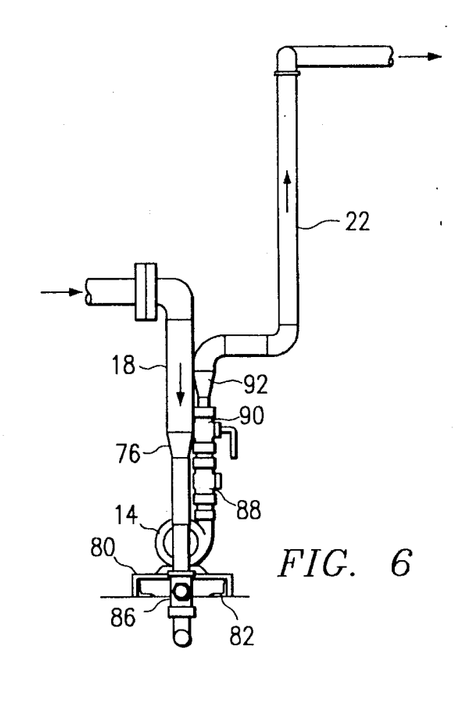
FIG. 6 is a side view of the recycle pump and pipe configuration for directing waste water from the DAF container to the aeration system of FIG. 1.
Figure 7:
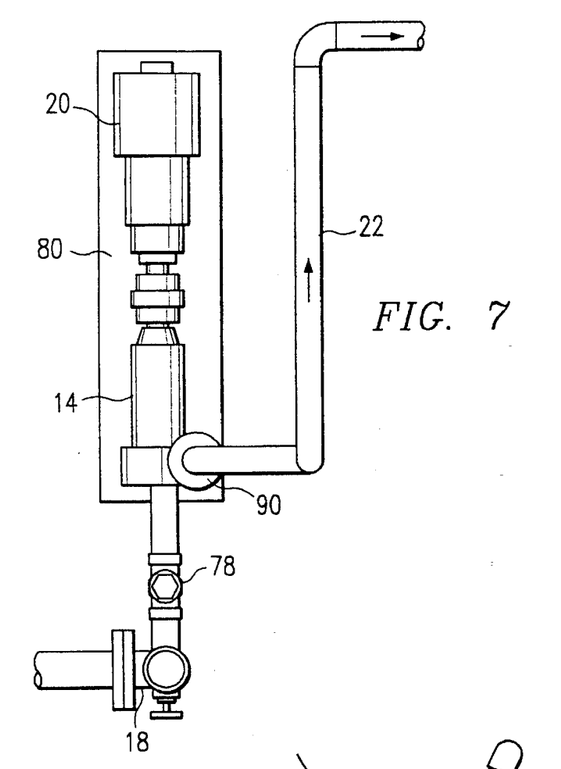
FIG. 7 is a top view of the recycle pump and pipe configuration of FIG. 6.

Referring now to FIGS. 6 and 7, the waste water circulated from the DAF container through the aeration system is pumped from the DAF container 12 and into the recycle pipe 18 by the recycle pump 14. The recycle pump 14 is preferably of the type manufactured by Crane-Deming and sold as Model No. 4021. The pump 14 is driven by a motor 20 and pumps waste water from the DAF container 12 through the recycle pipe 18, through a concentric reducer 76 into the aeration tank 24. As shown in FIG. 7, a full port ball valve 78 regulates the flow of water from the recycle pipe 18 and into the pump 14. The recycle pump 14 and motor 20 are mounted on a base 80 mounted on pump mount runners 82 as shown in FIGS. 2 and 3. As shown in FIG. 6, a full port ball valve 86 directs waste water from the recycle pipe 18 in the event of maintenance and repairs. The flow of waste water from the recycle pump 14 passes through and is controlled by a check valve 88 and a full port ball valve 90. The waste water then passes through a concentric expander 92 into the connecting pipe 22 for delivery to the aeration tank 24.

Figure 8:
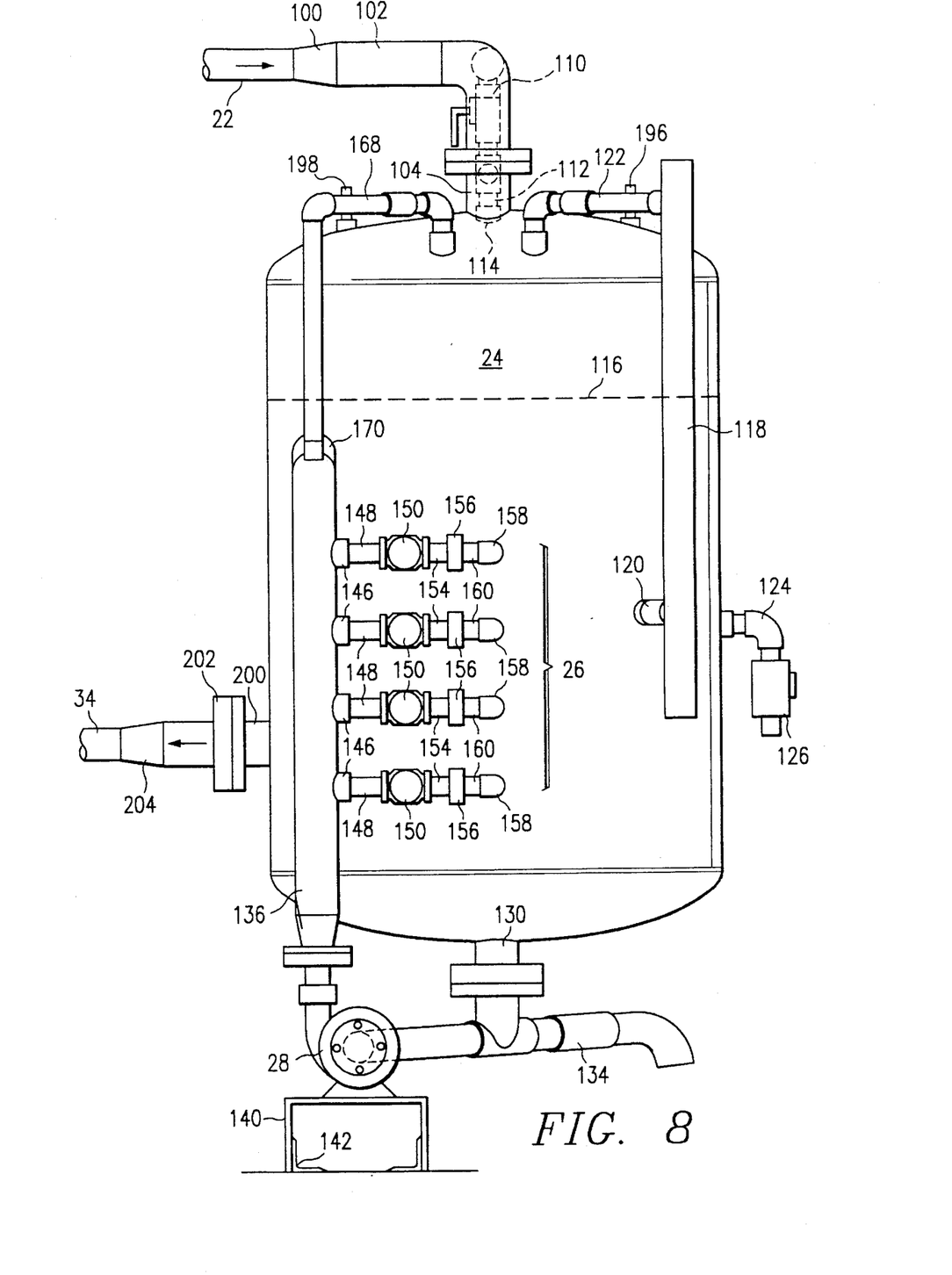
FIG. 8 is a side view of the aeration system of FIG. 1.

Referring now to FIG. 8, as the waste water is delivered through the connecting pipe 22 to the aeration tank 24 it passes through a concentric expander 100 into a delivery pipe 102. The waste water in the delivery pipe 102 then passes through an inlet 104 in the top center of the aeration tank 24.

Figure 9:
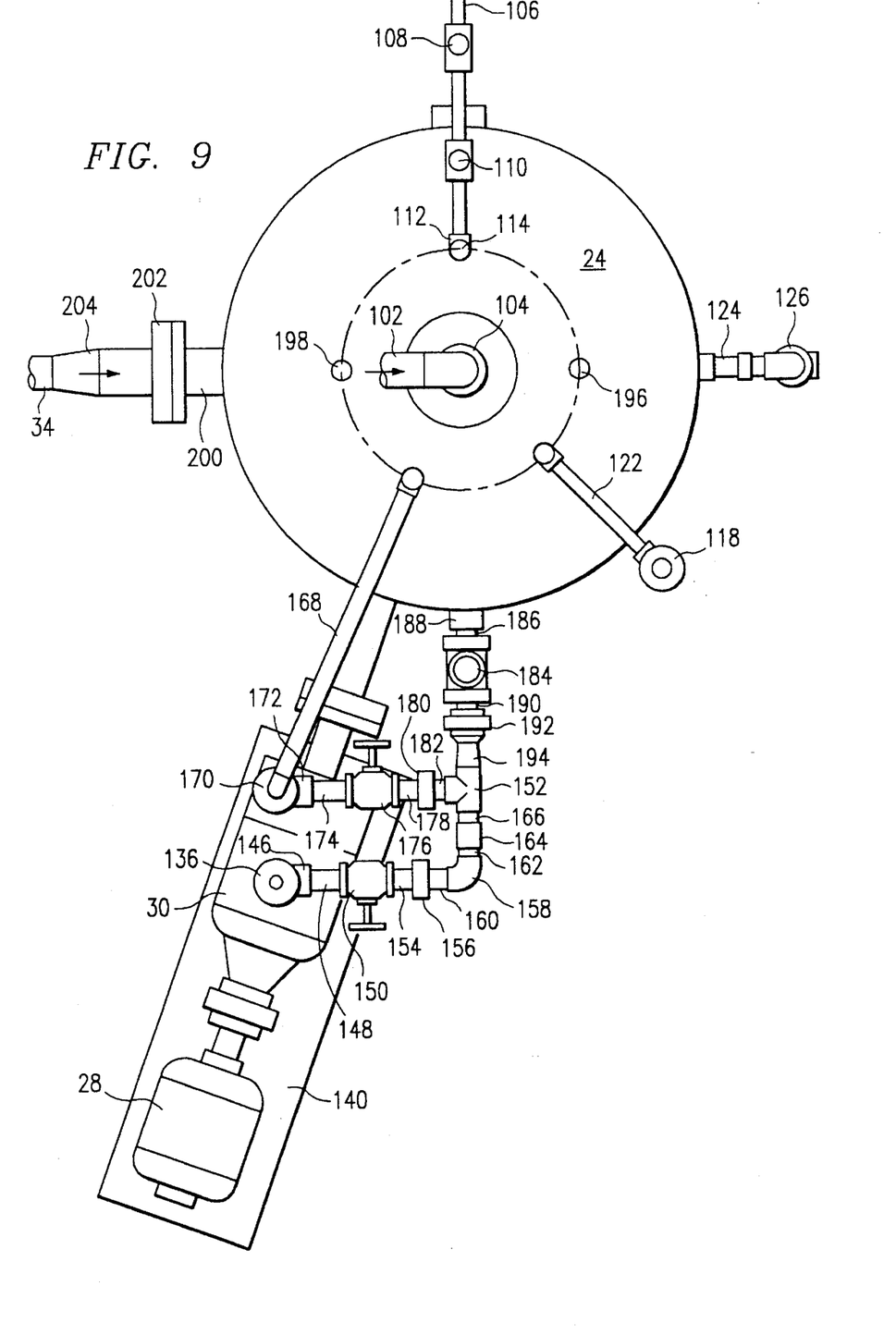
FIG. 9 is a top view of the aeration system of FIG. 8.

As shown in FIGS. 8 and 9, compressed air is input into the aeration tank 24 through a pipe 106 and a check valve 110, with the flow of compressed air being controlled by a solenoid valve 108. The compressed air supply piping also includes a reducer tee 112 connected to an inlet pipe 114 mounted in the top of the aeration tank 24. The pressure in the aeration tank 24 is maintained at 80–100 psi with the result that the waste water is maintained at a level of approximately 36", indicated by line 116, to provide continuous flow of aerated water from the system while achieving maximum entrainment of air in the water.

A visual level indicator 118 continuously indicates and controls the level of the waste water in the aeration tank 24. The level indicator 118 is preferably of the type manufactured by Granzow, Inc. and sold under Model No. BMG-1"150RF-VKM60"-MNA. The level indicator 118 is connected to the interior of the aeration tank 24 at one point by a connecting pipe 120 positioned in the wall of the tank 24 at a point well below the water level 116. A pipe 122 connects the level indicator 118 to the aeration tank 24 at a second point well above the water level 116.

Compressed air in the upper portion of the aeration tank 24 enters the level indicator 118 through the pipe 122. Waste water from the aeration tank 24 is forced under the action of the maintained pressure into the lower portion to the level indicator 118 through the connecting pipe 120.

Located in the level indicator 118 are two magnetic switches (not shown) connected through a conventional electrical system (not shown) to the solenoid valve 108. As the water in the level indicator 118 contacts the uppermost switch, the solenoid valve 108 is opened to allow the flow of compressed air into the aeration tank 24, thereby lowering the water level. As the water level drops below the lowermost magnetic switch, the solenoid valve 108 is closed to halt the flow of compressed air into the aeration tank 24, allowing the water level in the tank to rise. Thus, the water level in the aeration tank 24 is continuously measured and controlled by the level indicator 118.

A drain pipe 124 and a ball valve 126 are connected to the wall of the aeration tank 24 to allow for draining of waste water from the aeration tank.

Referring now to FIGS. 8 and 9, the water in the aeration tank 24 is aerated by pumping the water from the aeration tank through an outlet pipe 130 by means of the aeration pump 30. The aeration pump is preferably of the type manufactured by Crane-Deming and sold under Model No. 4011. Operative power for the aeration pump 30 is provided by the motor 28. The motor 28 and aeration pump 30 are mounted on a channel base 140 having angle clip feet 142.

Figure 10:
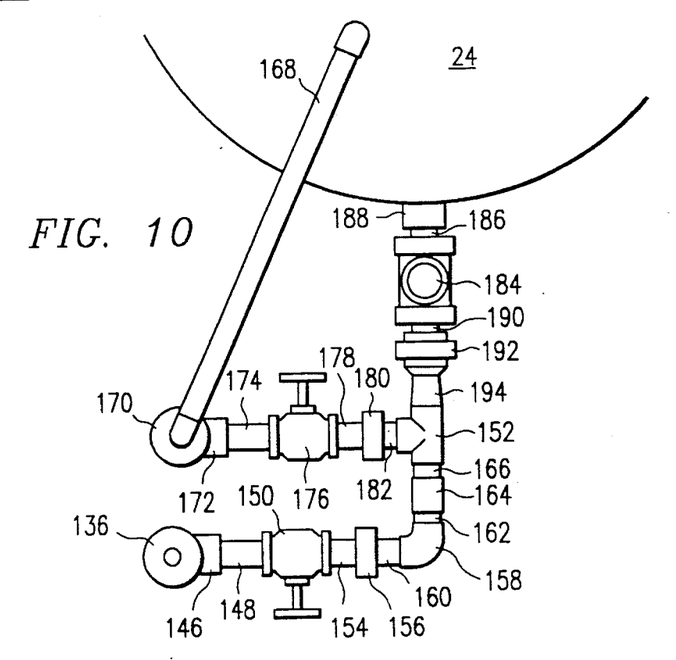
FIG. 10 is a partial top view similar to FIG. 9 showing only the air and water jet configuration of the aeration system of FIG. 8.

Referring now to FIGS. 8, 9, and 10, a full port ball valve 134 connected in the outlet pipe 130 provides a means for draining the waste water from the aeration pump 30 and aeration tank 24. The waste water from the aeration tank 24 is pumped by means of the aeration pump 30 into a manifold 136 mounted above the aeration pump and parallel to the aeration tank. The waste water in the manifold 136 is pumped under pressure through a multiple unit jet configuration 26 wherein each unit comprises a coupling 146 attached to the manifold 136 at one end and a nipple 148 on the other end. Mounted to the nipple 148 is a ball valve 150 which regulates the flow of waste water from the manifold 136 into a jet 152, preferably of the type manufactured by Penberthy and sold by that company under Model No. M-1-575. The ball valve 150 is connected by a nipple 154 to a female union 156, in turn connected to an elbow 158 by a nipple 160. The elbow 158 is connected by a nipple 162 to a thread reducer coupling 164, in turn connected to the jet 152 by a nipple 166. The water is forced under pressure through the piping configuration and into the jet 152 as a high pressure stream.

Still referring to FIGS. 8, 9, and 10, compressed air from the compressed air contained in the upper portion of the aeration tank 24 is also introduced into the jets 152. The compressed air from the aeration tank 24 passes through a pipe 168 mounted in the top of the aeration tank 24 and extending downwardly for attachment to the top of an air manifold 170. The air is directed from the air manifold 170 into the jets 152 through a multiple pipe configuration similar to the pipe configuration directing the flow of waste water from the manifold 136 to the jets 152. Thus, as shown in FIGS. 9 and 10, for each piping configuration, there is attached to the air manifold a coupling 172 connected by a nipple 174 to a full port ball valve 176, to regulate the flow of the compressed air into the jet 152. The ball valve 176 is connected by a nipple 178 to a female union 180, in turn connected by a nipple 182 to the jet 152.

As the compressed air enters the jets 152, it is entrained into the high pressure stream of water being forced through the jets 152, thereby mixing the compressed air and waste water under pressure and forcing the resulting aerated water back into the aeration tank 24 through a full port ball valve 184. The valve 184 regulates the flow of the high pressure stream of aerated water from the jets 152 into the aeration tank 24 and is connected to the aeration tank 24 through a nipple 186 connected to a coupling 188 mounted to the wall of the aeration tank 24 at a point well below the water level 116. By means of a nipple 190, the ball valve 184 is connected to a male/female union 192, in turn connected to the discharge section 194 of the jet 152. The action of pumping the waste water through the multiple jet configuration 26 efficiently utilizes the compressed air to more completely aerate the waste water than existing prior art apparatus.

Still referring to FIGS. 8 and 9, there is located in the top of the aeration tank 24 a sample outlet 196 for checking the contents of the aeration tank 24 and a safety/relief valve 198 to allow for the release of excess pressure in the aeration tank 24. As the waste water is continually recycled and aerated through the multiple jet configuration 26, aerated waste water is also being returned from the aeration tank 24 to the DAF container 12. The aerated water exits the aeration tank 24 through a pipe 200 having a flange 202 and a concentric expander 204 for directing the aerated water through the pipe 34 into the DAF container 12.

Referring now to FIGS. 11 and 12, the flow of aerated waste water in the pipe 34 to the DAF container 12 is regulated by a globe valve 220. As the aerated water passes through the globe valve 220, it makes a 45° turn through an elbow 222 and enters the surge tank pipe 36. The surge tank pipe 36 is connected at the uppermost end through a concentric expander 226 to a pipe 228 from a waste water surge tank (not shown). Thus, the surge tank pipe 36 receives aerated water from the aeration tank 24 as well as raw sewage from the surge tank. As shown in FIGS. 1 and 11, the surge tank pipe 36 is connected to the DAF container 12 by an elbow 230 attached to an inlet 38.

Again referring to FIGS. 1, 2, 3 and 5, as the aerated waste water passes through the inlet 38, it enters the inlet pipe 40 and moves into the chamber 42 from where it ultimately flows into the DAF container 12. After the aerated waste water enters the DAF container, particles entrained by the bubbles are floated to the surface of the waste water being held in the DAF container 12 to further clarify the waste water.

By aerating the waste water through use of the above-described method and apparatus, the compressed air is more efficiently utilized to obtain greater aeration of the waste water with a resultant increase in clarification. Additionally, the method of aerating the waste water outside of the DAF container 12 results in less movement in the DAF container contents, thereby reducing the disturbance of the sludge layer, and allowing for more efficient flotation of lighter particles to the surface of the waste water contained within the DAF container.

Although the preferred embodiment of the present invention has been illustrated in the accompanying Drawings and described in the foregoing Detailed Description, it will be appreciated by those skilled in the art that various modifications and rearrangements of the component parts and elements of the present invention are possible within the scope of the present invention.

We claim:

1. A method for aeration of wastewater exterior to a flotation container as part of a wastewater treatment system where the flotation and settling of particles occurs, comprising the steps of:

withdrawing wastewater from the flotation container where the flotation and settling of particles occurs;

pumping the wastewater from the flotation container into the top of a pressure tank above the wastewater level;

pressurizing from an external source of compressed air said pressure tank to a predetermined pressure to provide continuous flow of wastewater to maximize the entrainment of air in the water;

applying pressurized air from the pressure tank to each of a plurality of external aeration means;

regulating the flow of pressurized air through the external aeration means;

pumping the pressurized wastewater from the bottom of the pressure tank through each of the plurality of said external aeration means in the form of a high-pressure stream;

injecting the regulated pressurized air from said pressure tank into the high-pressure stream of wastewater in each of the plurality of the external aeration means to entrain the air therein to aerate said wastewater;

returning the aerated wastewater from each of the plurality of the external aeration means back into the pressure tank at a location below the wastewater level;

regulating the flow of the aerated wastewater from each of the external aeration means returned to the pressure tank;

mixing the aerated wastewater from the pressure tank with raw sewage in a surge tank pipe; and recycling the aerated wastewater mixed with raw sewage into a chamber within the flotation container where flotation and settling of particles occurs, the chamber minimizing turbulence in the flotation container.

2. The method of claim 1, further comprising the step of maintaining pressure in the pressure tank.

3. The method of claim 1, further comprising the step of controlling the flow of air and wastewater from the pressure tank to the external aeration means.

4. The method of claim 1 wherein the step of recycling the aerated wastewater from the pressure tank into the flotation container further comprises the steps of withdrawing the aerated wastewater from the pressure tank at a location below the wastewater level and returning the aerated wastewater to the flotation container at substantially the lowermost location in the flotation container.

5. The method of claim 1, further comprising the step of monitoring and controlling the level of wastewater in the pressure tank.

* * * * *